(12) United States Patent
Rasband et al.

(10) Patent No.: US 8,970,376 B2
(45) Date of Patent: *Mar. 3, 2015

(54) SYSTEMS FOR AND METHODS OF ASSIGNING PRIORITY TO READER ANTENNAE

(75) Inventors: Paul B. Rasband, Frederick, MD (US); Donald G. Bauer, Laurel, MD (US); Richard J. Campero, San Clemente, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,328

(22) Filed: Mar. 5, 2012

(65) Prior Publication Data

US 2012/0169475 A1    Jul. 5, 2012

Related U.S. Application Data

(63) Continuation of application No. 10/586,190, filed as application No. PCT/US2005/001259 on Jan. 25, 2005, now Pat. No. 8,154,409.

(60) Provisional application No. 60/536,703, filed on Jan. 16, 2004.

(51) Int. Cl.
| | |
|---|---|
| *H04Q 5/22* | (2006.01) |
| *G08B 13/14* | (2006.01) |
| *G06K 7/10* | (2006.01) |
| *H01Q 19/10* | (2006.01) |
| *H04W 4/00* | (2009.01) |
| *H04B 1/18* | (2006.01) |
| *G06K 7/00* | (2006.01) |
| *H01Q 3/24* | (2006.01) |
| *H01Q 21/28* | (2006.01) |

(52) U.S. Cl.
CPC .......... *G06K 7/0008* (2013.01); *G06K 7/10079* (2013.01); *G06K 7/10128* (2013.01); *G06K 7/10316* (2013.01); *H01Q 3/24* (2013.01); *H01Q 21/28* (2013.01)
USPC ........ 340/572.1; 340/572.2; 340/8.1; 340/5.2; 340/539.26; 340/2.4; 235/439; 343/838; 343/841; 455/562.1; 455/575.7; 455/435.3; 455/512; 455/166.2

(58) Field of Classification Search
USPC ................................ 340/572.7, 10.1, 539.11
See application file for complete search history.

(56) References Cited

U.S. PATENT DOCUMENTS

| | | | | |
|---|---|---|---|---|
| 5,507,035 | A * | 4/1996 | Bantz et al. | 455/133 |
| 5,594,980 | A * | 1/1997 | Tamura et al. | 29/33 M |
| 5,636,118 | A * | 6/1997 | Brewster et al. | 705/29 |
| 6,751,194 | B1 * | 6/2004 | Ueno | 370/235 |
| 6,804,578 | B1 * | 10/2004 | Ghaffari | 700/229 |
| 6,952,157 | B1 * | 10/2005 | Stewart et al. | 340/10.2 |

(Continued)

*Primary Examiner* — Fekadeselassie Girma
(74) *Attorney, Agent, or Firm* — Kacvinsky Daisak Bluni PLLC (57) ABSTRACT

Methods, systems, and articles of manufacture for assigning priority to antennae are disclosed. In accordance with a preferred embodiment of the invention, reader antennae identify the location of an object by detecting a tag or other identifier associated with each object. Sensors can be provided to provide additional information regarding the environment of the objects or their surroundings. A priority order is assigned to the reader antennae based on the location and other characteristics of the objects and/or their environment. A polling sequence for reading the reader antennae is determined according to the priority order.

16 Claims, 3 Drawing Sheets

(56) References Cited

U.S. PATENT DOCUMENTS

| | | |
|---|---|---|
| 6,972,663 B1 * | 12/2005 | Messlem et al. .............. 340/10.2 |
| 7,298,264 B1 * | 11/2007 | Kuzma et al. .............. 340/572.1 |
| 2002/0168039 A1 * | 11/2002 | Miyanaga et al. ............ 375/347 |
| 2003/0007473 A1 * | 1/2003 | Strong et al. ................. 370/338 |
| 2003/0197612 A1 * | 10/2003 | Tanaka et al. .............. 340/572.1 |
| 2003/0210148 A1 * | 11/2003 | Imasaki et al. ............. 340/573.1 |
| 2004/0027241 A1 * | 2/2004 | Forster .......................... 340/445 |
| 2006/0022800 A1 * | 2/2006 | Krishna et al. ............... 340/10.2 |
| 2006/0071794 A1 * | 4/2006 | Sayers et al. ............... 340/572.7 |
| 2006/0234776 A1 * | 10/2006 | Ishihara et al. ............ 455/562.1 |

\* cited by examiner

SYSTEMS FOR AND METHODS OF ASSIGNING PRIORITY TO READER ANTENNAE

CROSS REFERENCE TO RELATED APPLICATIONS

This is a continuation of pending U.S. non-provisional patent application Ser. No. 10/586,190, filed Aug. 11, 2008, which is a national stage entry of International Application No. PCT/US2005/001259, filed Jan. 25, 2005, which claims priority to U.S. Provisional Application No. 60/536,703, filed Jan. 16, 2004, the entirety of which applications are hereby incorporated by referenced in their entirety.

BACKGROUND

Radio frequency identification (RFID) systems typically use one or more RFID reader antennae to send radio frequency (RF) signals to items tagged with RFID tags. The use of such RFID tags to identify an item or person is well known in the art. In response to the radio frequency (RF) signals from an RFID reader antenna, the RFID tags, when excited, produce a disturbance in the magnetic field (or electric field) that is detected by the RFID reader antenna. Typically, such tags are passive tags that are excited or resonate in response to the RF signal from an RFID reader antenna when the tags are within the detection range of the RFID reader antenna.

The detection range of the RFID systems is typically limited by signal strength to short ranges, for example, frequently less than about one foot for 13.56 MHz systems. Therefore, portable reader units may be moved past a group of tagged items in order to detect all the tagged items, particularly where the tagged items are stored in a space significantly greater than the detection range of a stationary or fixed single RFID reader antenna. Alternately, a large RFID reader antenna with sufficient power and range to detect a larger number of tagged items may be used. However, such an antenna may be unwieldy and may increase the range of radiated power beyond allowable limits. Furthermore, these RFID reader antennae are often located in stores or other locations where space is at a premium and it is expensive and inconvenient to use such large RFID reader antennae. In another possible solution, multiple small antennae may be used but such a configuration may be awkward to set us when space is at a premium and when wiring is preferred to be hidden.

Current RFID reader antennae are designed so that a sufficient read range maybe maintained between the antenna and associated tags, without running afoul of FCC limitations on radiated emissions.

Resonant RFID reader antenna systems are currently utilized in RFID applications, where numerous RFID reader antennae are connected to a single reader. Each RFID reader antenna may have its own tuning circuit that is used to match to the system's characteristic impedance. An RFID reader or interrogator maybe connected to more than one antenna, for example, to save cost or complexity of using many readers, particularly if a fast read rate is not necessary. However, sharing a reader means that a given antenna may not be read as often. It may be desired, however, to know immediately when an item is removed from the vicinity of an antenna, or at least to monitor the antenna for a time thereafter. It may therefore be useful to develop methods that allow the RFID reader to prioritize the order in which antennae are read.

SUMMARY

Methods, systems, and articles of manufacture for assigning priority to antennae are disclosed. In accordance with a preferred embodiment of the invention, reader antennae identify the location of an object by detecting a tag or other identifier associated with each object. Sensors can be provided to provide additional information regarding the environment of the objects or their surroundings. A priority order is assigned to the reader antennae based on the location and other characteristics of the objects and/or their environment. A polling sequence for reading the reader antennae is determined according to the priority order.

DETAILED DESCRIPTION

Preferred embodiments and applications of the invention will now be described. Other embodiments may be realized and changes may be made to the disclosed embodiments without departing from the spirit or scope of the invention. Although the preferred embodiments disclosed herein have been particularly described as applied to the field of RFID systems, it should be readily apparent that the invention may be embodied in any technology having the same or similar problems. Furthermore, while the examples herein are particularly described in relation to a shelf system, for example, in a facility such as a retail store, it should be readily apparent that the invention may be embodied in other forms and in other facilities.

Figure 1:
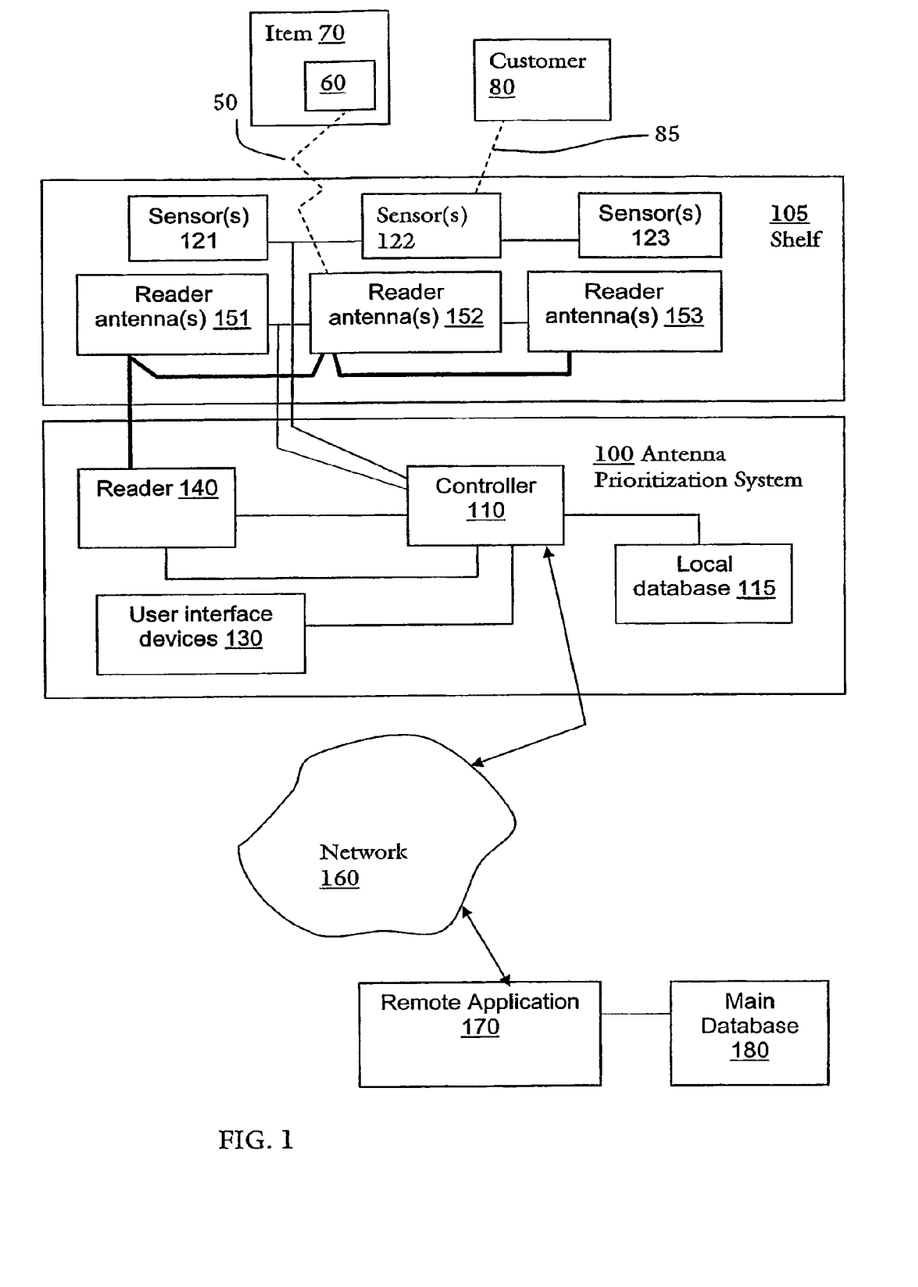
FIG. 1 is a block diagram depicting an exemplary system in accordance with a preferred embodiment of the invention.

An exemplary embodiment of the invention may be implemented in Antenna Prioritization System 100 as illustrated in FIG. 1. The exemplary Antenna Prioritization System 100 preferably includes a Controller 110 coupled to a Local Database 115, a Reader 140, and User Interface Devices 130. In this embodiment, Controller 110 may include one or more central processing units (CPUs) or other calculating or processing devices to provide processing of input/output data between Antenna Prioritization System 100, Network 160, Local Database 115, a Reader 140, and User Interface Devices 130.

Preferably, Controller 110 executes one or more computer-executable programs stored in memory (e.g., Local Database 115, etc.). Local Database 115 can include one or more memory devices comprising any recordable or rewritable medium for storing information (e.g., hard drive, flash RAM, optical disc, compact disc, memory card, DVD, etc.). User Interface Devices 130 include any device that can be used to enter information (e.g., commands, data, etc.) into Controller 110 (e.g., keyboard, touch screen, wireless device, PDA, infrared device, radio frequency device, etc.).

In a preferred embodiment of the invention, Antenna Prioritization System 100 may further include Reader 140. Reader 140 can be used to interrogate, read, or otherwise activate one or more reader antennae (e.g., Reader Antenna 151-153) coupled to Reader 140. In this exemplary implementation, Reader Antennae 151-153 are incorporated in shelf 105 and may include tuning circuitry as described in U.S. patent application Ser. No. 10/338,892, which is incorporated herein by reference in its entirety. Reader 140 transmits the information obtained from Reader Antenna 151-153 to Controller 110 in a manner well known in the art.

In a preferred embodiment, Reader Antenna 151-153 are preferably RFID reader antennae capable of generating radio frequency waves 50. The radio frequency waves interact with RFID tags 60 which can be affixed to, integrated with, or otherwise coupled to an object (e.g., product, employee, customer, etc.). An RFID tag 60, when excited by radio frequency waves 50, produces a disturbance in the magnetic field (or electric field) that is detected by RFID reader antennae. Preferably, reader 140 may be instructed by Controller 110, for example, to interrogate, read, or otherwise activate one or more reader antennae (e.g., Reader Antennae 151-153) according to a priority order in a particular polling sequence. For example, Controller 110 may instruct Reader 140 to interrogate Reader Antennae 151-153 by reading Reader Antenna 153 followed by Reader Antenna 152 followed by Reader Antenna 151. As discussed herein, in accordance with a preferred embodiment of the invention, the priority order can be assigned based on the location of Item 70 or Customer 80 (e.g., the proximity of Item 70 or Customer 80 to Reader Antenna 152, etc.).

In accordance with a preferred embodiment of the invention, the reader antennae may be affixed to a mobile or stationary object. As depicted in the exemplary implementation of FIG. 1, Reader Antennae 151-153 are affixed to a product support structure such as Shelf 105. Reader Antennae 151-153 can be used to communicate by, for example, radio frequency waves 50 with RHD tags such as RFID 60, shown attached to item 70. In accordance with a preferred embodiment, sensors are utilized (e.g., affixed to a mobile or stationary object, etc.) to provide additional information regarding the environment of objects being monitored or their surroundings. In this exemplary implementation, Sensors 121-123 are affixed to Shelf 105 and provide additional information to Controller 110. Sensors 121-123 can include weight sensors, vibration sensors, pressure sensors, pushbutton sensors, infrared sensors, optical sensors, audio sensors, etc. In a preferred embodiment, other sensing signals 85 can provide additional information to Controller 110 which can be combined information from Sensors 121-123 or independently provided to Controller 110. In accordance with a preferred embodiment of the invention, the information provided by sensors can be used to affect the priority assigned to different reader antennae as described herein.

Antenna Prioritization System 100 may be connected directly or indirectly (e.g., through network 160, as shown in FIG. 1) to one or more Remote Applications 170 coupled to Main Database 180. Network 160 may represent any type of communication configuration that allows Antenna Prioritization System 100 and Remote Application 170 to exchange information. For example, network 160 may be a Local Area Network (LAN), a Wide Area Network (WAN), Bluetooth™, and/or a combination of networks, such as the Internet. Network 160 may also include the infrastructure that allows Antenna Prioritization System 100 and remote application 170 to exchange information using wireless based communications.

Preferably, Local Database 115 and Main Database 180, in each instance, may include one or more storage device systems (e.g., internal hard drive, external hard drive, flash RAM, ROM, memory card, and optical disk, etc.) that store information (e.g., computer executable programs, data regarding products and/or facilities, etc.) used by Antenna Prioritization System 100 and/or Remote Application 170. The term "database" can refer to the means for storage of more than one data file, computer executable program, or table. In a preferred embodiment, Local Database 115 and/or Main Database 180 may comprise more than one database or a series of databases housed locally or in a remote location. Such databases may be controlled, for example, by a database server (not shown), such as an SQL database server. A Java DataBase Connectivity (JDBC) driver for the SQL server may also be used to access the SQL server database. Local Database 115 and/or Main Database 180 may be embodied within Antenna Prioritization System 100, or external to Antenna Prioritization System 100, for example, on a server (not shown). Furthermore, Local Database 115 and/or Main Database 180 may be shared with more than one Antenna Prioritization System 100.

In accordance with a preferred embodiment, Local Database 115 and/or Main Database 180 may be used to store item or object information (e.g., identification information regarding an item such as Stock Keeping Unit (SKU) data, etc.). The SKU information may include item type, manufacturer and origin, size, color, style, as well as a wide variety of other types of information that are understood by those skilled in the art. Such item information may be stored, for example, in tables maintained on Local Database 115 and/or Main Database 180 or in a remote or local database or system. Examples of item information include, but are not limited to:

(1) A Uniform Product Code (UPC) and/or an Electronic Product Identification Code (EPIC). It should be understood that items made by a certain manufacturer in a certain size, color, etc. may have all the same UPC but each may have a unique EPIC;

(2) Current price of the item;

(3) Seasonality of the item. A seasonality indicator may represent a relationship between an item and a period of time associated with different events or seasons, such as holidays, a time frame surrounding a certain date of a special event (e.g., the Super Bowl), etc. For example, a soap product may have a seasonality indicator representing no seasonal characteristics, such as "no season," wreaths may have a "Christmas" indicator, charcoal may have a "summer" indicator, etc. Further, promotional items (e.g., those items that are being specially marketed by a manufacturer or retailer) may have a seasonality indicator associated with a time frame (e.g., "July 2003"). The seasonality indicators may be used to determine when to remove or restock certain items in inventory; and (4) Shelf life of the item. The term "shelf life" can refer to a period of time that an item may be allowed to be included in inventory. For example, perishable products, such as milk, may have a limited period of time that they may be presented on a shelf for sale to a customer. Non-perishable products may also have a limited period of time to be present in inventory based on one or more factors, such as previous sales of items of a similar type, limited promotional time frames, etc.

Additionally, for an item collection of a certain type (e.g., an individual box of any type of item), examples of stored item information include, but are not limited to, the following:

(1) The EPIC of the item;

(2) The UPC of the item which can be associated with the SKU information described above;

(3) Other types of information not directly known from the SKU (e.g., color, style, size, etc.);

(4) A serial number associated with the item (if other than the EPIC);

(5) A cost of the item to a business entity associated with its use, such as a retailer;

(6) A date the item was first placed in a particular location or locations;

(7) The expiration date of the item (if any);

(8) Item location information representing a current physical location of the item (or if sold, the last known location of the item);

(9) The price at which an item was sold (if already sold);

(10) The date the item was sold (if already sold);

(11) The preferred customer number of a purchaser (if already sold) representing a unique number assigned to a user that purchases or may purchase items; and (12) A unique serial number associated with the RFID tag 60, for example, an identification number written to the RFID tag 60 by its manufacturer.

One skilled in the art will appreciate that the above examples of item information are not intended to be limiting. Local Database 115 and/or Main Database 180 may include more or fewer tables or other configurations of item information used by Remote Application 170 and/or Antenna Prioritization System 100. Some or all of the information in Main Database 180 may also be stored in Local Database 115.

In accordance with a preferred embodiment, the priority order can be determined in a variety of manners influenced by a variety of factors (e.g., data derived from sensors, reader antennae, historical data, marketing data, etc.). The term "priority order" refers to a relative positioning or arranging of objects (e.g., reader antennae, fixtures, objects, etc.) in an ordered sequence. The term "priority order" may also refer to a length of time to be spent (e.g., monitoring) on a given object. The term "predetermined criteria" refers to a factor or factors that differentiate the characteristics of one object from another object. For example, objects can be arranged in a priority order according to predetermined criteria (e.g., weight, size, density, etc.). In this example, heavier objects have a higher priority with respect to lighter objects. Thus, in this exemplary priority order, objects are arranged in a priority order from the heaviest object to the lightest object. An object that is assigned a higher "priority" or "level" in the priority order can, for example, have a higher position in a priority order compared to an object assigned a "lower" priority or "level."

An object that is assigned a higher level in a priority order is also said to have a higher preference level than objects at lower levels in the priority order. The term "preference level" refers to the relative value assigned to an object compared to other objects in a group or groups of objects, In one preferred embodiment of the invention, preference levels can be assigned to objects according to any given basis (e.g., predetermined criteria, randomly, equal frequency, etc.). A priority order can then be arranged by comparing the preference levels assigned to various objects, and a priority order can be determined by arranging the objects according to their preference levels (e.g., from highest to lowest, lowest to highest, etc.). For example, a priority order can be arranged for 100 objects with each object being assigned a mutually exclusive preference level from 1-100. In this example, an object with a preference level of 1 will have the highest priority in the priority order, while an object with a preference level of 100 will have the lowest priority in the priority order. After the preference levels of the 100 objects have been assigned, they can be arranged in an exemplary priority order from 1-100. (To the extent preference levels are not assigned on a mutually exclusive basis, relative priority of objects may be assigned arbitrarily or using any other additional basis.)

In a preferred embodiment of the invention, the priority order can be arranged without reference to preference levels. For example, a priority order can be arranged randomly, according to predetermined time schedule, or any other suitable factor. In another preferred embodiment of the invention, a priority order can be arranged according to multiple predetermined criteria. For example, objects can be arranged according to both their size and weight. The term "object" refers to any tangible item capable of being detected (e.g:, customer, a product, a basket, a cart, etc.). An object can be associated, for example, with an RFID tag or another identifying tag. The term "predetermined criteria" refers to a factor or factors that differentiate the characteristics of one object from another object. For example, objects can be arranged in a priority order according to predetermined criteria (e.g., weight, size, density, etc.). For example, heavier objects can have a higher priority with respect to lighter objects. Thus, in this exemplary priority order, objects are arranged in a priority order from the heaviest object to the lightest object. An object that is assigned a higher "priority" or "level" in the priority order can, for example, have a higher position in a priority order compared to an object assigned a "lower" priority or "level." Predetermined criteria can also be weighted with respect to each other. Thus, the weight of an object can influence its position in a priority order twice as much as its size.

In a preferred embodiment of the invention, a first reader antenna having a higher preference level is assigned a higher priority than at least a second reader antenna having a lower priority. In this embodiment, a preference level is assigned to each antenna and the antennae are arranged in a priority order according to their relative preference levels. An antenna with higher preference level has a corresponding higher priority than an antenna with a lower preference level.

In a further preferred embodiment of the invention, reader antennae are read or interrogated according to their priority order. Thus, an antenna having a higher priority (e.g., based on being assigned a higher preference level) is read or interrogated before an antenna having a lower priority (e.g., having a corresponding lower preference level).

In another preferred embodiment of the invention, preference levels can be assigned according to the object or objects detected by each of the plurality of reader antennae. For example, the presence of a particular product having an identifying tag may result in a higher preference level assigned to the corresponding antenna. Assignment of a higher preference level of an antenna may result in being assigned a higher position in a priority order. A store manager, for example, may want to closely monitor the stock of a particularly popular item in order to provide accurate and up to date information regarding the supply to customers. In another preferred embodiment, a first reader antenna that detects a larger number of products is assigned a higher preference level than at least a second reader antenna that detects a smaller number of products.

In another preferred embodiment of the invention, a probability that a detected product will be moved from a predetermined location can be used as predetermined criteria for assigning preference levels (or otherwise setting priority order). The probability that a product will be moved can be determined in a variety of ways. It can be, for example, calculated by detecting movement frequency of the plurality of products from a predetermined location during a predetermined fine interval and calculating the average movement frequency of the plurality of products from the predetermined location during the predetermined time interval. In a preferred embodiment, a preference level can be assigned to each of the plurality of reader antennae according to the probability the object will be moved. In this example, a higher preference level corresponds to a higher position in a priority order. Using this preferred embodiment of the invention, a store manager can calculate the number of popular items moved from a particular shelf in an hour to determine how many items need to be replaced.

In another preferred embodiment, the preference level can be assigned according to a preference factor. The term "preference factor" refers to predetermined criteria used to assign a preference level to an object. Preference factors can include, but are not limited to, movement of an identifying tag associated with a reading antenna, proximity of a customer to a reader antenna, proximity of an employee to a reading antenna, and proximity of a product to a reading antenna. For example, if an identifying tag or group of identifying tags is moved out of the range of a reader antenna, the reader antenna can be assigned a higher preference level than an antenna where identifying tags have not been moved. A priority order can be arranged according to, for example, frequency of identifying tag movement where increased movement of identifying tags corresponds to a higher priority than decreased or no movement of identifying tags.

In another preferred embodiment of the invention, preference levels or priority order can be assigned based on a triggering event or input data from a device such as a computer server, a computer workstation, a handheld device, a telephone, a wireless device, etc. In this example, priority can be assigned manually or according to a time interval. Thus, a store manager or a company manager located in a remote location can interrogate a reader antenna e.g., associated with a particular shelf to monitor the movement of a popular item at a particular time of day or during an important time period (e.g., Christmas shopping season).

In another preferred embodiment of the invention, preference levels or priority order can be assigned to reader antennae based on input data from a sensor. For example, a sensor may be an optical sensor, a vibration sensor, an audio sensor, a pressure sensor, a pushbutton sensor, etc., indicating an event (e.g., the presence or absence of a customer, employee, particular product, etc.). The sensor can be used to assign a preference level to reader antennae. For example, if a sensor detects the presence of a customer, the antenna associated with the sensor can be assigned a higher preference level and a corresponding higher position in a priority order than an antenna that is not associated with the presence of customer.

In a preferred embodiment of the invention, the priority order can be stored in a table (e.g., in Local Database 115) for use (e.g., by Controller 110) in determining a polling sequence for interrogating reader antennae. The term "polling sequence" refers to the order (or length of time) in which reader antenna are read or interrogated. The polling sequence can be arranged according the priority order, preference levels, or any other suitable factor or factors.

Preferred embodiments of the invention and the steps for assigning preference levels to reader antennae, determining a priority order, and/or determining a polling sequence can be embodied in a computer executable medium stored in a computer readable medium (e.g., hard drive, flash drive, memory card, RAM, ROM, DVD, CD, optical disc, etc.). The computer readable medium can be used in, for example, Controller 110 according to preferred embodiments of the invention described herein.

In an exemplary implementation of a preferred embodiment of the invention, the priority order is equal to the summation of individual factors that may be weighted according to predetermined criteria as set forth below:

$$\text{Read Priority} = \sum_{i=1}^{n} X_{im} \times w_{im}$$

where $P_m$ = Read Priority for antenna m
n = Number of rules for prioritization
$X_{im}$ = ith priority factor associated with mth antenna
$w_{im}$ = ith weighting factor associated with mth antenna In one application of this exemplary implementation, for example, each antenna is assigned a preference level based on how often the inventory of tagged objects or items inside the antenna's range is moved. For example, let $t_i$ be the time of read event i. The term "event" in this example preferably refers to a change in inventory (e.g., increase, decrease, change to the identifying tag, etc.). For example, the disappearance of a tagged item from the range of an antenna is defined as a read event since the event is viewed by the antennae as a change in inventory. In this implementation, the priority order can be defined as follows:

$t-t_i$ is the elapsed time since read event i;
$\alpha$ and $\beta$ are constants;

$$\text{Let } \Phi_i = \alpha + (t-t_i) \text{ or } \Phi_i = \alpha + \beta(t-t_i)$$

At the moment read event i occurs, $\Phi$ is defined and has a value of $\alpha$. As time continues the value of $\Phi_i$ grows linearly. The priority value $\gamma_m$ for antenna m is defined as:

$\gamma m \equiv \sum_{i=1}^{Nm} \exp\{-\Phi i\}$ where $N_m$ is the total number of read events on record for the antenna m. Preferably, user-defined criteria may be defined to limit the number $N_m$. For example, $N_m$ might only include events within the last hour, last 15 minutes, or other time span, or only the most recent 10 events for each antenna.

In this preferred implementation, $\gamma_m$ will be largest for antennae with a large number of recent read events. Antennae can receive a read priority from largest $\gamma_m$ to smallest $\gamma_m$. Other formulas may also be used for $\gamma_m$. For example, $$\gamma m \equiv \sum_{i=1}^{Nm} \left(\frac{1}{\Phi_i}\right)$$

where, if a large time interval elapses without reading a particular antenna, greater priority may be placed on reading that antenna. For example, a function $\epsilon$ could be defined as $\epsilon \equiv \delta(t - t_{last})$ where $t_{last}$ is the time of the last read event and $\delta$ is a constant. The read priority for an antenna can be based on the sum of c and $\gamma_m$. In this example, the equation will balance the need to read some antennae more frequently with the need to read all antennae occasionally.

In accordance with a preferred embodiment of the invention, specialized prioritization rules can be developed and implemented (e.g., programmed into system 100) to aid in the determination of a priority order. As an example, a prioritization rule can be developed in which an antennae or sensor can be desensitized to multiple events by "debouncing" the antenna or sensor. For example, where shelf 105 (FIG. 1) is implemented in a retail store environment having a sensor in the form of a customer request button, and that button is pressed multiple times within a given time interval (e.g., 10 seconds), the button can be considered to have been pressed only once.

Another prioritization rule may be developed, for example, in which a particular event (e.g., a customer is detected near a monitored object by a sensor) will result in assigning the highest priority to any reader antenna associated with that event. The rule may further specify that the absence of the event (e.g., the detection of a customer) will incrementally decrease the priority assigned to the associated antenna.

It should be understood that the prioritization cycle and the read cycle may run at different speeds and not necessarily in sequence, since while the antennae may be read in a particular prioritized sequence, it may be possible or desirable to monitor other sensors at different speeds. This prioritization cycle may be run continuously, or periodically. If run periodically during business hours, the periodic interval may be relatively short. On the other hand, during non-business hours, it may not be necessary to run the read prioritization cycle, but may be preferable, for example, simply to read all antennae at the same priority.

Additional preferred embodiments of the invention include inactivating or otherwise refraining from interrogating reader antennae. For example, a reader antenna can be inactivated if its position in a priority order is below a threshold level. In another preferred embodiment of the invention, a reader antenna can be inactivated in response to inactivation signals (e.g., detecting movement of an identifying tag, proximity of a customer to a reader antenna, proximity of an employee to a reader antenna, proximity of a product to a reader antenna, etc.). Inactivation signals can temporarily inactivate a reading antenna or a group of reading antennae. For example, a reading antenna can be shut down if an employee (e.g., wearing an RFID tag) is re-stocking a shelf.

It is to be understood that application of the invention to a specific problem or environment will be within the capability of one having ordinary skill in the art. Some of the exemplary implementations of preferred embodiments of the invention are illustrated by the following non-limiting examples.

EXAMPLE

Figure 2A:
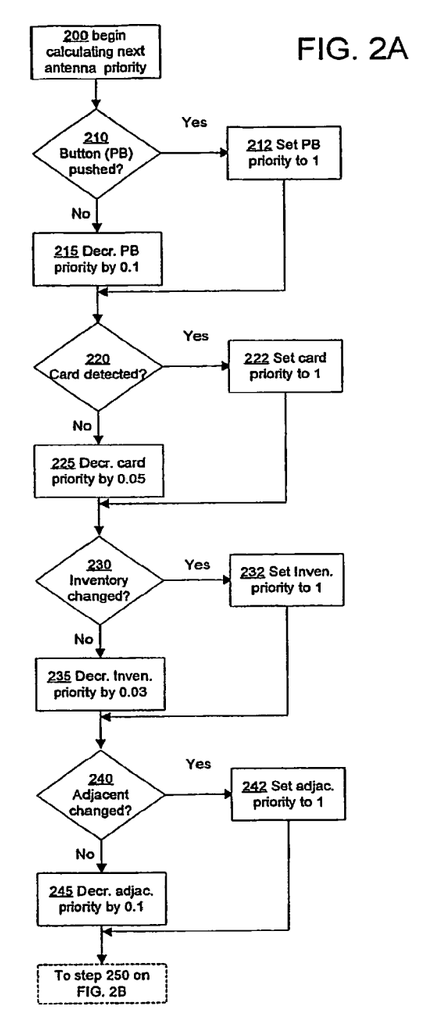
FIGS. 2A-2B illustrate exemplary steps of assigning priority to reader antennae in accordance with a preferred embodiment of the invention.
Figure 2B:
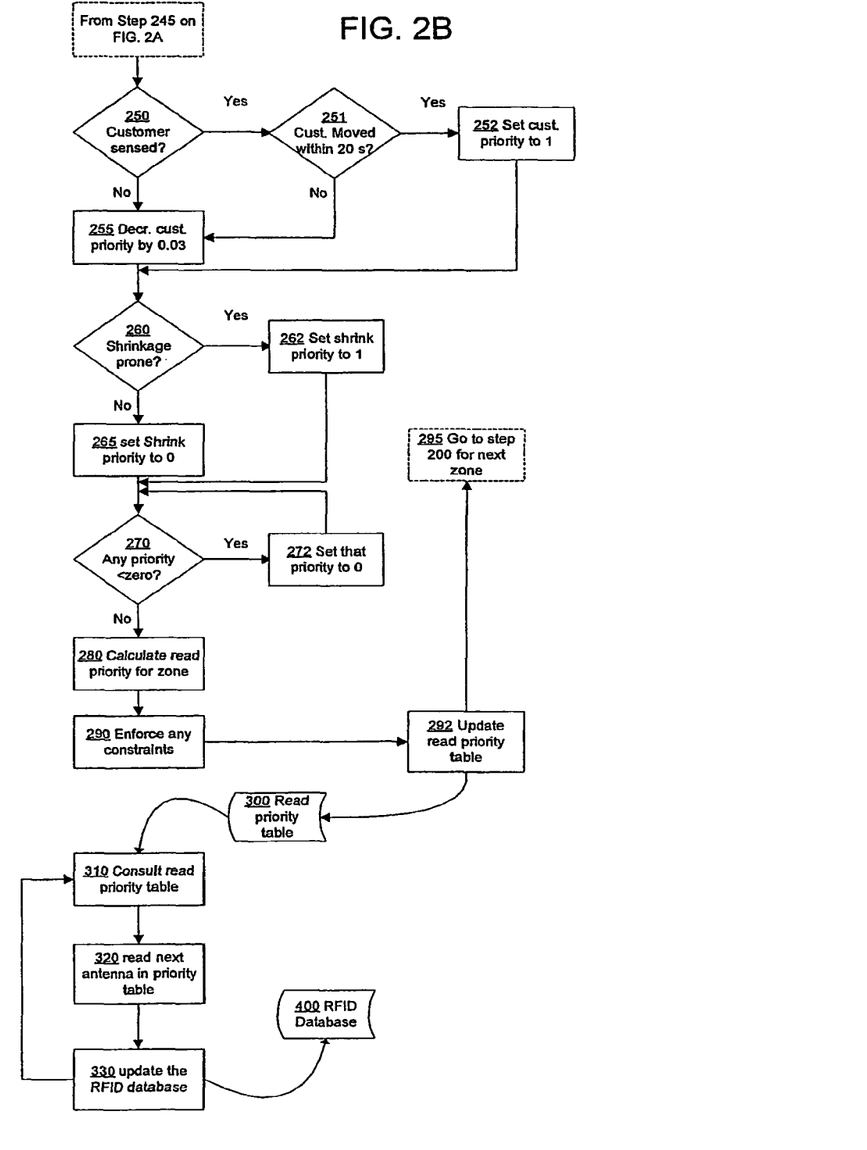

FIGS. 2A and 2B show exemplary method steps of assigning priority to reader antennae, and/or a location associated with a reader antenna, in accordance with a preferred embodiment of the invention. The method steps provide information which is used in the determination of whether to set the priority of the antenna associated with a given location to a predetermined value (e.g., 1) or to decrease the priority assigned to the antenna. The method may be implemented by the system shown in FIG. 1 or any known means programmed, hard-wired, or otherwise configured to perform the steps described herein.

Antenna Read Prioritization Loop

The priority calculation process for each antenna is initiated in Step 200. A determination is made in step 210 as to whether the pushbutton has been pushed. If the button has been pushed, the pushbutton priority value for the antenna associated with the location of the pushbutton is set to 1 (step 212). If the button has not been pushed the pushbutton priority value of the antenna associated with the location is decreased by 0.1 (step 215).

In step 220, it is determined if a card (i.e., employee identity card) is present. A magnetic, optical, infrared, RFID or other sensor can detect the presence of a card with an associated identity tag. If a card is detected (e.g., indicating the presence of an employee restocking a shelf) the card priority for reader antenna associated with the card sensor is set to 1 (step 222). If a card is not detected, the card priority value of the antenna associated with the location is decreased by 0.1 (step 225).

In step 230, whether the inventory for a location associated with a given antenna has changed is determined. Inventory can be measured by interrogating the reader associated with a location (e.g., shelf) to determine the number of items or objects having associated tags (e.g., RFID tags). The system can determine the inventory at different times and compare the inventory results to determine if the inventory has changed (e.g., increased, decreased, replaced with a different item or items, etc.). Tithe inventory has changed, the inventory priority for the associated antenna is set to 1 (step 232). If the inventory has not changed, the inventory priority for the location associated with the antenna is decreased by 0.03 (step 235).

In step 240, whether the inventory in a first location adjacent to an antenna associated with a second location has changed is determined. If the inventory has changed, then the adjacency priority for reader antenna associated with the second location is set to a predetermined value of 1 (step 242). If the inventory has not changed, the adjacency priority of the antenna associated with the second location is decreased by 0.1 (step 245).

In step 250, whether a customer (or another person or object) has been sensed in or near a location associated with a given antenna is determined. A customer can be sensed, for example, by any suitable sensor (e.g., optical, infrared, RFID tag, etc.). If a customer is not detected, then the customer priority is decremented by 0.03 (step 255). If a customer is detected, the system determines whether the customer has moved outside the range of the antenna or other sensor within a predetermined time interval (e.g., 20 seconds) by, for example, determining the customer's presence at a first time and at a second time (step 251). If the customer is still detected after passage of the predetermined time interval, the customer priority for the antenna or the location associated with the antenna is set to 1(step 252). If the customer is not detected after the predetermined time interval, the customer priority is decreased by 0.03 (step 255).

In step 260, whether the antenna is associated with an area that has been prone to shrinkage (e.g., product loss) is determined. If the antenna associated with a location is prone to shrinkage, then the shrinkage priority for the location is set to 1(step 262). If the location associated with the antenna is not associated with shrinkage, then the shrinkage priority is set to 0 (step 272).

In step 270, whether any priorities have been decreased below zero is determined. If so, that priority is set to 0 (step 272). When no priority values are below zero, a read priority for the antenna based, for example, on a priority summation for that antenna of the products of the individual priority values and individual weighting factors (step 280) is calculated. The individual weighting factors likewise may be adjustable for each antenna.

In step 290, constraints can be enforced. For example, a constraint may require that an antenna can neither be read more frequently than every 2 seconds, nor less often than every two hours.

In step 292, information regarding the read priority is updated (e.g., in table 300) including the new read priority calculated for the antenna in question. In this exemplary implementation, read priority table 300 provides the priority order for Reader Antennae 151-153 depicted in FIG. 1. The cycle then continues in step 295 by returning to step 200 in FIG. 2A and considering the next antenna.

Read Process Loop

A preferred embodiment of the invention provides an antenna read process loop as shown, for example, in steps 310-330 of FIG. 2B. In this exemplary implementation, the read process loop determines the polling sequence of the reader antennae (e.g., Reader Antennae 151-153 of FIG. 1) according to the priority order as determined, for example, by the antenna read prioritization loop depicted in steps 200-295. The antenna read prioritization loop and the read process loop may operate at different speeds.

In step 310, read priority table 200 is consulted to determine which antenna to read next based on its priority compared to other antennae. In step 320, the antenna with the highest priority is read by the antenna reader (e.g., Reader 140 depicted in FIG. 1). In step 330, the new information obtained by interrogating the antenna is stored (e.g., in Database 400). Next, the antenna read process loop cycles back to step 310 to determine which antenna to read next.

While preferred embodiments of the invention have been described and illustrated, it should be apparent that many modifications to the embodiments and implementations of the invention can be made without departing from the spirit or scope of the invention. For example, although embodiments and implementations of the invention have been specifically illustrated herein as applied to reader antennae for RFID tags placed on an item, the invention may easily be deployed or embodied in any form of (RF- or non-RF-based) antennae. Although only a single Antenna Prioritization System 100 has been illustrated, it should be apparent that there may be a plurality of such Systems 100, and when implemented, one or more of the Systems 100 may be connected (directly or indirectly) with one or more shelves 105 (or other components or modules).

To the extent the illustrated embodiments have not specified the type of communication medium (or protocol) used to connect the various modules (e.g., shown in FIG. 1), it should be apparent that any known wired/wireless technology may be used to implement the various embodiments of the invention (e.g., PCI bus, FireWire®, USB, Internet, intranets, private bulletin boards, individual local or wide area networks, proprietary chat rooms, ICQ IRC channels, instant messaging systems, WAP, Bluetooth, etc.) using real-time or non-real-time systems alone or in combination.

In accordance with a preferred embodiment, one or more of the same or different user interfaces (e.g., user interface device 130 (FIG. 1)) are provided as part of (or in conjunction with) the illustrated systems to permit one or more users to interact with the systems. Individual ones of a plurality of devices (e.g., network/stand-alone computers, personal digital assistants (PDAs), WebTV (or other Internet-only) terminals, set-top boxes, cellular/PCS phones, screen phones, pagers, kiosks, or other known (wired or wireless) communication devices, etc.) may similarly be used to execute one or more computer programs (e.g., universal Internet browser programs, dedicated interface programs, etc.) to allow users to interface with the systems in the manner described.

The modules described herein, particularly those illustrated or inherent in, or apparent from the instant disclosure, may be one or more hardware, software, or hybrid components residing in (or distributed among) one or more local and/or remote computer or other processing systems. Although the modules may be shown or described herein as physically separated components (e.g., controller 110, local database 115, user interface 130, reader 140, etc.), it should be readily apparent that the modules may be omitted, combined or further separated into a variety of different components, sharing different resources (including processing units, memory, clock devices, software routines, etc.) as required for the particular implementation of the embodiments disclosed (or apparent from the teachings herein). Indeed, even a single general purpose computer (or other processor-controlled device) executing a program stored on an article of manufacture (e.g., recording medium such as a CD-ROM, DVD-ROM, memory cartridge, etc.) to produce the functionality referred to herein may be utilized to implement the illustrated embodiments. User interface devices may be any device used to input and/or output information. The user interface device may be implemented as a graphical user interface (GUI) containing a display or the like, or may be a link to other user input/output devices known in the art.

In addition, database, storage, and other memory units described herein may be any one or more of the known storage devices (e.g., Random Access Memory (RAM), Read Only Memory (ROM), hard disk drive (HDD), floppy drive, zip drive, CD-ROM, DVD-ROM, bubble memory, redundant array of independent disks (RAID), storage accessible network (SAN), network accessible storage (NAS), etc.), and may also be one or more memory devices embedded within a controller or CPU, or shared with one or more of the other components. These units may be disposed locally, remotely, distributed, or otherwise logically or physically configured to practice the invention.

Moreover, the operational flows and methods shown in (and described with respect to) FIGS. 2A and 2B can be modified to include additional steps, to change the sequence of the individual steps as well as combining (or subdividing), simultaneously running, omitting, or otherwise modifying the individual steps shown and described in accordance with the invention. Numerous alternative methods may be employed to produce the outcomes described with respect to the preferred embodiments illustrated above or equivalent outcomes. It should be apparent to those of ordinary skill in the art that method steps inherent or apparent from the disclosure herein of various physical systems (or components thereof) may be implemented using the disclosed (or any other systems) in accordance with the invention. Detailed descriptions of such method steps therefore need not be provided herein.

It is to be understood therefore that the invention is not limited to the particular embodiments disclosed (or apparent from the disclosure) herein, but only limited by the claims appended hereto.

The invention claimed is:

1. A method of operating a plurality of reader antennae, comprising:
   determining a priority order of the plurality of reader antennae, where a preference level is assigned to each of the plurality of reader antennae based on information relating to products detected by each of the plurality of reader antennae and the priority order is derived from the preference levels, wherein the information relating to the products is stored in respective RFID tags associated with the products; and
   setting a polling sequence for reading the plurality of reader antennae according to the priority order determined in said determining step.

2. The method of claim 1, wherein said assigning step further comprises assigning a first reader antenna having a higher preference level with a higher priority than at least a second reader antenna having a lower priority.

3. The method of claim 1, further comprising the step of reading the plurality of reader antennae according to the priority order determined in said determining step.

4. The method of claim 3, wherein said reading step comprises reading more frequently a first reader antennae that has a higher preference level compared to a second reader antennae.

5. The method of claim 1, further comprising inactivating a reader antenna.

6. The method of claim 5, wherein said inactivating step comprises inactivating a reader antenna in response to one of the group of:
   detecting movement of an identifying tag;

proximity of a customer to a reader antenna;
proximity of an employee to a reader antenna; and
proximity of a product to a reader antenna.

7. The method of claim 1, wherein said determining step comprises assigning the priority order such that the plurality of reader antennae can be read at an equal frequency.

8. The method of claim 1, wherein said assigning step comprises assigning a first reader antenna that detects a larger number of products with a higher preference level than at least a second reader antenna that detects a smaller number of products.

9. The method of claim 1, wherein said assigning step further comprises assigning preference levels according to a preference factor selected from the group consisting of:
 movement of an identifying tag associated with a reader antenna;
 proximity of a customer to a reader antenna;
 proximity of an employee to a reader antenna; and
 proximity of a product to a reader antenna.

10. The method of claim 1, wherein said assigning step further comprises assigning preference levels based on input data from a device selected from the group of:
 a computer server;
 a computer workstation;
 a handheld device;
 a telephone; and
 a wireless device.

11. The method of claim 1, wherein said assigning step comprises assigning preference levels based on input data from a sensor.

12. The method of claim 11, wherein said assigning step further comprises assigning preference levels based on input data from a sensor selected from the group consisting of:
 an optical sensor;
 a vibration sensor;
 an audio sensor;
 a pressure sensor; and
 a pushbutton sensor.

13. A method of adjusting the priority order of a polling sequence for a plurality of RFID antennae, the method comprising:
 providing a plurality of product support structures, each product support structure associated with at least one RFID reader antenna;
 placing a plurality of products on at least one of the product support structures, each of the plurality of products associated with an RFID tag;
 identifying the location of each of the plurality of products by detecting the associated RFID tags with the plurality of RFID reader antennae;
 assigning a priority order to the plurality of RFID antennae, the priority order determined by assigning a preference level to each of the plurality of RFID antennae based on information relating to products detected by each of the plurality of RFID reader antennae, wherein the information relating to the products is stored in the RFID tags associated with the products; and
 assigning a polling sequence for reading the plurality of RFID reader antennae according to the priority order.

14. The method of claim 13, wherein said assigning a priority further comprises assigning preference levels based on input data from a sensor.

15. The method of claim 13, wherein said assigning a priority further comprises assigning a first RFID reader antenna that detects a larger number of products with a higher preference level than at least a second RFID reader antenna that detects a smaller number of products.

16. An antenna prioritization system for prioritizing the reading of a plurality of reader antennae, the system comprising:
 a controller device configured to determine a priority order of the plurality of RFID antennae based on information relating to products detected by each of the plurality of RFID reader antennae, and for setting a polling sequence for reading ones of the plurality of RFID reader antennae according to the priority order, wherein the information relating to the products is stored in respective RFID tags associated with the products; and
 a reader for reading ones of the plurality of reader antennae in accordance with the polling sequence.

* * * * *